US012574331B2

(12) United States Patent
Chapman et al.

(10) Patent No.: US 12,574,331 B2
(45) Date of Patent: Mar. 10, 2026

(54) TUNNELING OF PERIPHERAL-BUS PROTOCOL TRAFFIC OVER COHERENT FABRIC

(71) Applicant: Mellanox Technologies, Ltd., Yokneam (IL)

(72) Inventors: Hillel Chapman, Ramat HaShofet (IL); Idan Burstein, Carmiel (IL); Natan Goldfarb, Kiryat Bialik (IL); Avishay Snir, Regba (IL); Tsahi Daniel, Tel Aviv (IL); Saugata Bhattacharyya, Union City, CA (US); Maxim Fudim, Rishon Lezion (IL)

(73) Assignee: Mellanox Technologies, Ltd., Yokneam (IL)

( * ) Notice: Subject to any disclaimer, the term of this patent is extended or adjusted under 35 U.S.C. 154(b) by 31 days.

(21) Appl. No.: 18/539,416

(22) Filed: Dec. 14, 2023

(65) Prior Publication Data

US 2025/0202832 A1      Jun. 19, 2025

(51) Int. Cl.
H04L 47/10         (2022.01)
H04L 12/46         (2006.01)
H04L 47/62         (2022.01)

(52) U.S. Cl.
CPC .......... H04L 47/39 (2013.01); H04L 12/4633 (2013.01); H04L 47/622 (2013.01)

(58) Field of Classification Search
CPC .... H04L 12/4633; H04L 47/39; H04L 47/622
See application file for complete search history.

(56) References Cited

U.S. PATENT DOCUMENTS

| | | | | |
|---|---|---|---|---|
| 10,979,258 B1 * | 4/2021 | Chen | ................... | H04L 25/0272 |
| 11,398,980 B2 * | 7/2022 | Bharadwaj | ........... | H04L 49/254 |
| 12,164,428 B2 * | 12/2024 | Frank | .................. | G06F 12/0828 |
| 2012/0023304 A1 * | 1/2012 | Chan | ....................... | G06F 9/546 |
| | | | | 711/170 |
| 2019/0102292 A1 * | 4/2019 | Agarwal | ................. | G06F 12/06 |
| 2022/0283972 A1 * | 9/2022 | Tummala | ........... | G06F 13/4004 |

(Continued)

FOREIGN PATENT DOCUMENTS

CN        101159677 A  *  4/2008

OTHER PUBLICATIONS

Translation of CN-101159677-A (Year: 2008).*

(Continued)

*Primary Examiner* — Henry Tsai
*Assistant Examiner* — John B Roche
(74) *Attorney, Agent, or Firm* — Meitar Patents Ltd.; Daniel Kligler

(57) ABSTRACT

A peripheral device includes two or more peripheral-bus modules, a coherent interconnect, and two or more tunnel adapters coupled between the peripheral-bus modules and the coherent interconnect. The peripheral-bus modules are to exchange peripheral-bus packets with one another in accordance with a peripheral-bus protocol. The coherent interconnect is to connect electronic components of the peripheral device in accordance with a coherent interconnect protocol. The tunnel adapters are to convey the peripheral-bus packets between the peripheral-bus modules over the coherent interconnect, by translating between the peripheral-bus packets and messages of the coherent interconnect protocol.

16 Claims, 3 Drawing Sheets

(56) References Cited

U.S. PATENT DOCUMENTS

| | | | |
|---|---|---|---|
| 2023/0163997 A1* | 5/2023 | Sauer ................. | H04L 12/4633 |
| | | | 370/401 |
| 2024/0273049 A1* | 8/2024 | Pan ......................... | H04L 45/74 |
| 2025/0028885 A1 | 1/2025 | Mishra et al. | |

OTHER PUBLICATIONS

Arm Limited and Contributors, "GitHub—ARM-software/arm-trusted-firmware: Read-only mirror of Trusted Firmware-A," pp. 1-3, years 2013-2019, as downloaded from https://github.com/ARM-software/arm-trusted-firmware.

NVM Express, "What is NVMe Technology?", pp. 1-3, Nov. 23, 2023, as downloaded from https://web.archive.org/web/20231123223120/https://nvmexpress.org/.

IPC/JEDEC J-STD-020F, "Moisture/Reflow Sensitivity Classification for Non-hermetic Surface Mount Devices (SMDs)," pp. 1-28, Dec. 2022.

ANSI/ESD S20.20-2021, "ESD Association Standard for the Development of an Electrostatic Discharge Control Program for Protection of Electrical and Electronic Parts, Assemblies and Equipement,(Excluding Electrically Initiated Explosive Devices)," pp. 1-28, Oct. 2021.

Arm Limited or Its Affiliates, "AMBA® 5 CHI—Architecture Specification," pp. 1-528, years 2017-2022.

"TileLink—SiFive TileLink Specification—Version 1.8.1," pp. 1-93, Jan. 27, 2020.

US Non-Final Office Action, U.S. Appl. No. 18/773,681, dated Jan. 8, 2026.

Notice of References Cited, U.S. Appl. No. 18/773,681, dated Jan. 8, 2026.

* cited by examiner

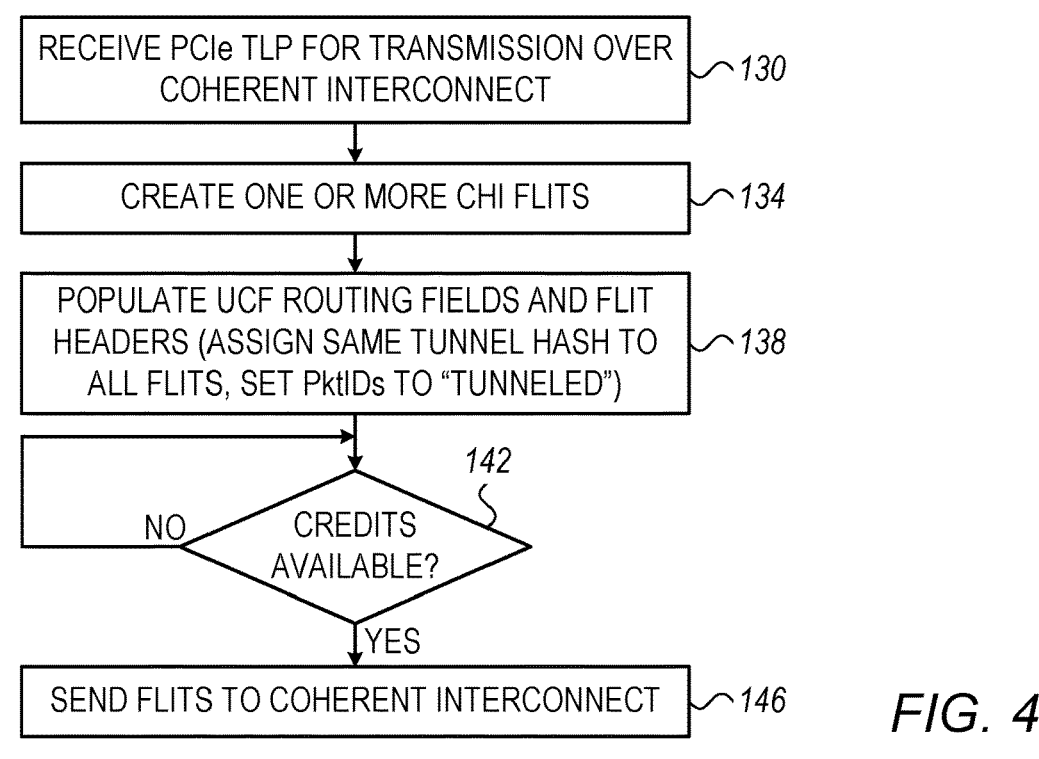

RECEIVE PCIe TLP FOR TRANSMISSION OVER COHERENT INTERCONNECT — 130

CREATE ONE OR MORE CHI FLITS — 134

POPULATE UCF ROUTING FIELDS AND FLIT HEADERS (ASSIGN SAME TUNNEL HASH TO ALL FLITS, SET PktIDs TO "TUNNELED") — 138

CREDITS AVAILABLE? — 142
NO
YES

SEND FLITS TO COHERENT INTERCONNECT — 146

*FIG. 4*

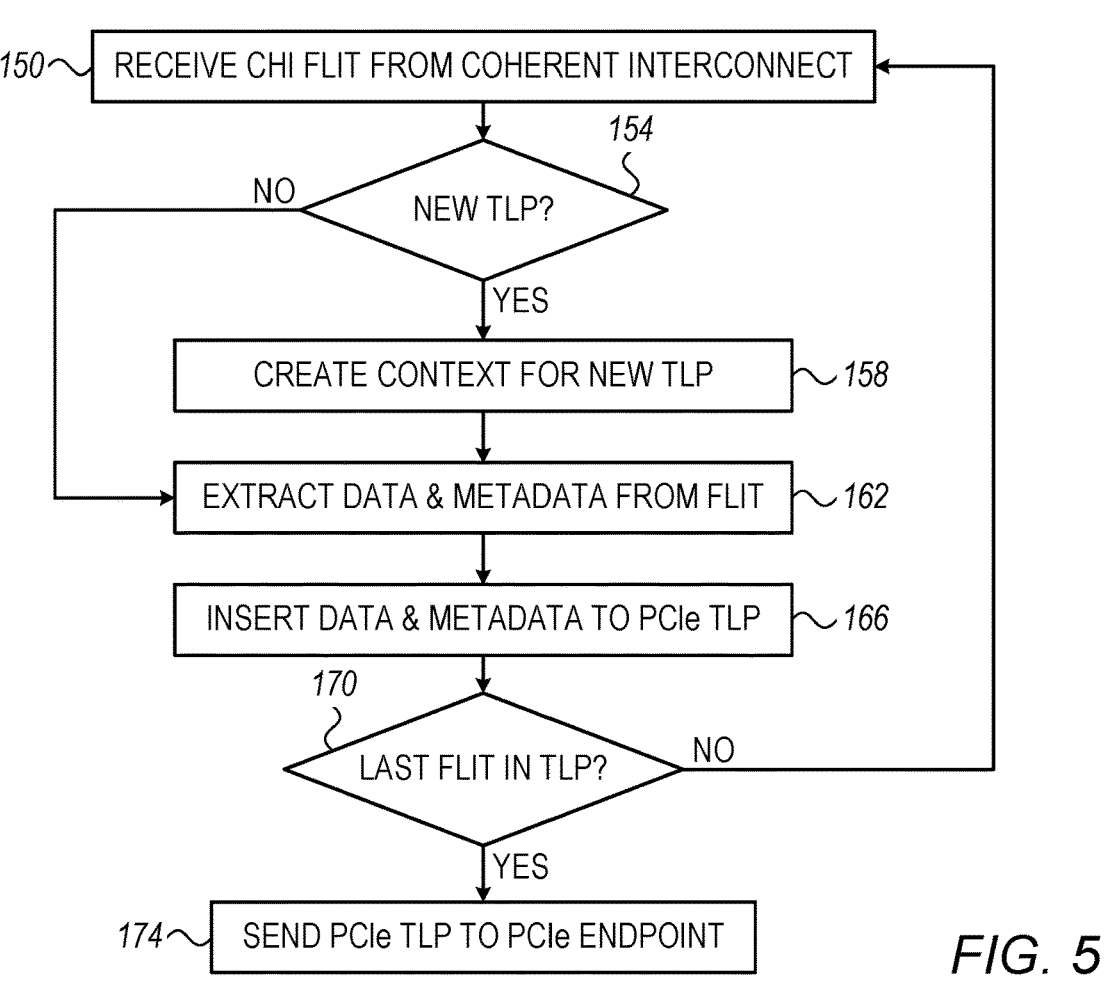

150 — RECEIVE CHI FLIT FROM COHERENT INTERCONNECT

NEW TLP? — 154
NO
YES

CREATE CONTEXT FOR NEW TLP — 158

EXTRACT DATA & METADATA FROM FLIT — 162

INSERT DATA & METADATA TO PCIe TLP — 166

LAST FLIT IN TLP? — 170
NO
YES

174 — SEND PCIe TLP TO PCIe ENDPOINT

*FIG. 5*

TUNNELING OF PERIPHERAL-BUS PROTOCOL TRAFFIC OVER COHERENT FABRIC

FIELD OF THE INVENTION

The present invention relates generally to computing and communication systems, and particularly to tunneling of peripheral-bus communication via interconnect fabrics in peripheral devices.

BACKGROUND OF THE INVENTION

Computing systems often comprise a peripheral device that is connected to a host via a peripheral bus. Peripheral devices may comprise, for example, network adapters, storage devices, accelerators and Graphics Processing Units (GPUs). Peripheral buses, also referred to as system buses, may comprise, for example, Peripheral Component Interconnect Express (PCIe), Advanced Extensible Interface (AXI), Compute Express Link (CXL), Nvlink or Nvlink Chip-to-Chip (Nvlink-C2C).

SUMMARY OF THE INVENTION

An embodiment of the present invention that is described herein provides a peripheral device including two or more peripheral-bus modules, a coherent interconnect, and two or more tunnel adapters coupled between the peripheral-bus modules and the coherent interconnect. The peripheral-bus modules are to exchange peripheral-bus packets with one another in accordance with a peripheral-bus protocol. The coherent interconnect is to connect electronic components of the peripheral device in accordance with a coherent interconnect protocol. The tunnel adapters are to convey the peripheral-bus packets between the peripheral-bus modules over the coherent interconnect, by translating between the peripheral-bus packets and messages of the coherent interconnect protocol.

In some embodiments, a given peripheral-bus module among the peripheral-bus modules is to communicate with a host over a peripheral bus in accordance with the peripheral-bus protocol. In a disclosed embodiment, the messages of the coherent interconnect protocol are smaller in data size than the peripheral-bus packets, and a given tunnel adapter among the tunnel adapters is to translate a peripheral-bus packet into a plurality of the messages. In an example embodiment, the messages of the coherent interconnect protocol are smaller in data size than the peripheral-bus packets, and a given tunnel adapter among the tunnel adapters is to identify a plurality of the messages corresponding to a peripheral-bus packet, and to reconstruct the peripheral-bus packet from the identified plurality of messages.

In some embodiments, the coherent interconnect protocol does not guarantee unconditional in-order delivery of the messages, and, in translating the peripheral-bus packets into the messages, a given tunnel adapter among the tunnel adapters is to select two or more of the messages, and to cause the coherent interconnect to deliver the selected messages in-order. In an example embodiment, the given tunnel adapter is to cause the coherent interconnect to deliver the selected messages in-order by assigning to the selected messages a same hash value, thereby causing the coherent interconnect to route the selected messages over a same route.

In a disclosed embodiment, a given tunnel adapter among the tunnel adapters is to (i) receive messages corresponding to peripheral-bus packets originating from multiple different peripheral-bus modules, (ii) maintain a respective context for each of the multiple different peripheral-bus modules, and (iii) reconstruct the peripheral-bus packets originating from each of the multiple different peripheral-bus modules using the respective context.

In some embodiments, at least two of the tunnel adapters are to control a flow of the messages therebetween by applying credit-based flow control.

There is additionally provided, in accordance with an embodiment of the present invention, a method including exchanging peripheral-bus packets between two or more peripheral-bus modules in a peripheral device, in accordance with a peripheral-bus protocol. Communication is carried out among electronic components of the peripheral device using a coherent interconnect, in accordance with a coherent interconnect protocol. The peripheral-bus packets are conveyed between the peripheral-bus modules over the coherent interconnect, by translating between the peripheral-bus packets and messages of the coherent interconnect protocol.

The present invention will be more fully understood from the following detailed description of the embodiments thereof, taken together with the drawings in which:

BRIEF DESCRIPTION OF THE DRAWINGS

FIG. 4 is a flow chart that schematically illustrates a method for translating a PCIe TLP into CHI FLITs, in accordance with an embodiment of the present invention; and FIG. 5 is a flow chart that schematically illustrates a method for translating CHI FLITs into a PCIe TLP, in accordance with an embodiment of the present invention.

DETAILED DESCRIPTION OF EMBODIMENTS

Overview

Figure 1:
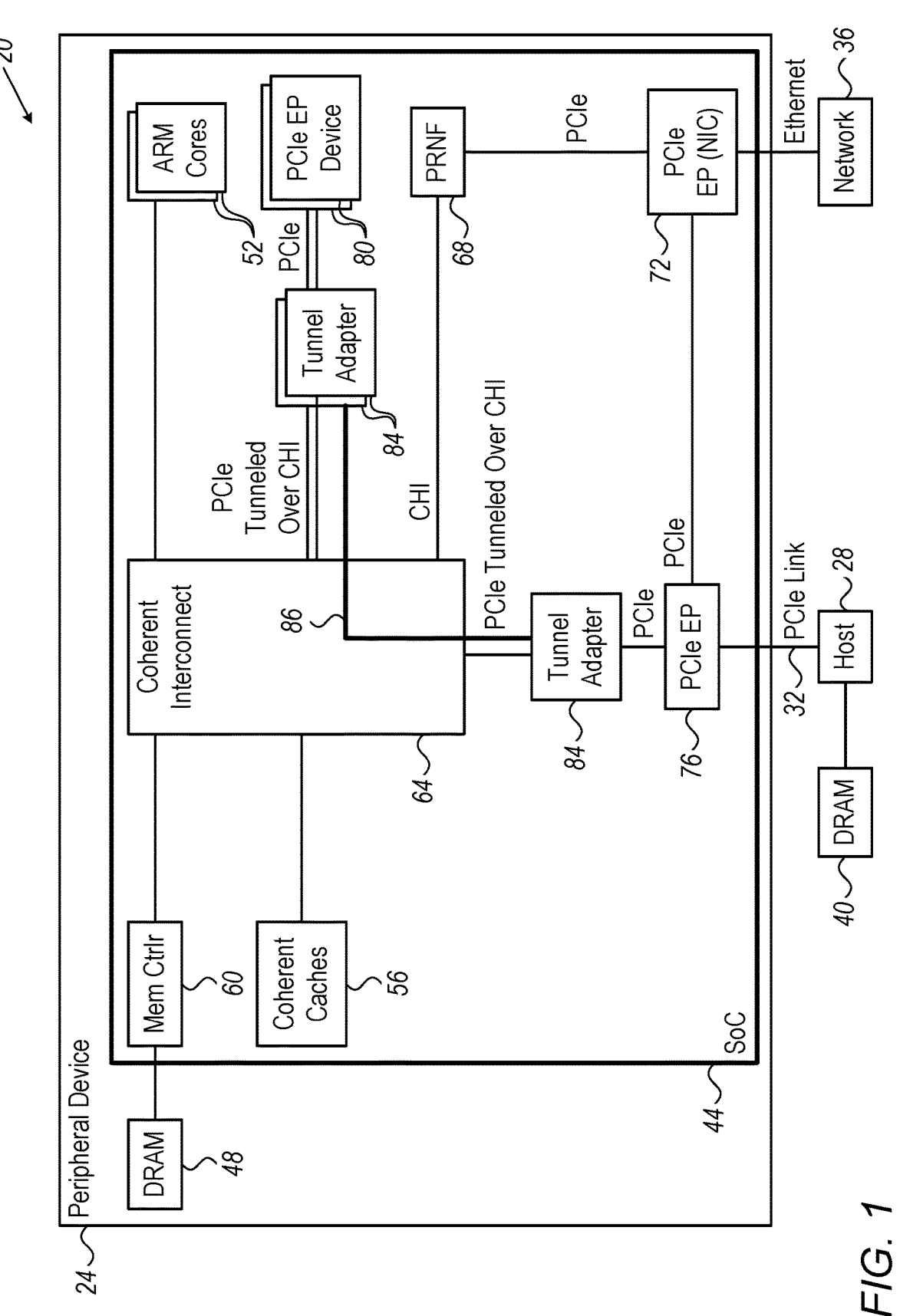
FIG. 1 is a block diagram that schematically illustrates a computing system comprising a peripheral device that employs tunneling of PCIe traffic over a coherent interconnect, in accordance with an embodiment of the present invention.

Embodiments of the present invention that are described herein provide methods and systems for tunneling peripheral-bus protocol traffic over a coherent interconnect in a peripheral device. The disclosed techniques are applicable to various types of peripheral devices, such as n adapters, storage devices, storage controllers, Graphics Processing units (GPUs), accelerators and others.

In some embodiments, a peripheral device communicates with a host over a peripheral bus using a peripheral-bus protocol. The embodiments described herein refer mainly to the Peripheral Component Interconnect express (PCI) protocol, by way of example. The disclosed techniques are applicable to any other suitable peripheral-bus protocol such as Compute Express Link (CXL) or Nvlink.

The peripheral device additionally comprises powerful computational resources, e.g., multiple processing cores, a memory controller for storing data in a memory, multiple coherent caches, and a coherent interconnect that connects these components. In an example configuration, the coherent interconnect, and the various components it connects, communicate in accordance with the Coherent Hub Interconnect (CHI) protocol. CHI is specified, for example, in "AMBA® 5 CHI Architecture Specification," September, 2022. Alternatively, other suitable coherent interconnect protocols can be used. One non-limiting example is the TileLink protocol.

In an example implementation, the processing cores, the memory controller, the coherent caches and the coherent interconnect are laid out densely in a System-on-Chip (SoC). The various components connect to the coherent interconnect using CHI links.

The SoC further comprises multiple PCIe modules that communicate with the host over a PCIe bus. The PCIe modules may comprise, for example, a PCIe Endpoint (EP) coupled to the PCIe bus, and one or more PCIe EP devices. The PCIe EP devices may be located anywhere in the SoC. It is possible in principle to route a dedicated PCIe connection between each PCIe EP device and the PCIe EP. In practice, however, routing of PCIe connections across the SoC is extremely challenging, e.g., due to the dense layout and interconnections between the processing cores, coherent caches and coherent interconnect.

In embodiments of the present invention, PCIe traffic is conveyed ("tunneled") over the coherent interconnect. In an example embodiment, the peripheral device comprises multiple "tunnel adapters" that connect the PCIe modules to the coherent interconnect. Each tunnel adapter comprises circuitry that translates between peripheral-bus packets (e.g., PCIe Transaction-Level Packets—TLPs) and messages of the coherent interconnect protocol (e.g., CHI Flow-Control Units—FLITs). When using this architecture, the use of dedicated PCIe connections is obviated and the overall design of the peripheral device is simplified considerably.

Example implementations of the disclosed tunneling techniques are described herein, including examples for mapping between PCIe TLPs and CHI FLITs. Techniques for ensuring in-order delivery of selected FLITs over the coherent interconnect, e.g., for complying with ordering requirements of the PCIe protocol, are also described.

System Description

FIG. 1 is a block diagram that schematically illustrates a computing system 20 comprising a peripheral device 24 that employs tunneling of PCIe traffic over a coherent interconnect, in accordance with an embodiment of the present invention. Peripheral device 24 serves a host 28, e.g., a server or other computer. The peripheral device communicates with the host over a PCIe link 32 using the PCIe protocol. Alternatively, any other suitable peripheral bus and peripheral-bus protocol, e.g., Compute Express Link (CXL), Nvlink, can be used, as well as protocols such as Ethernet and InfiniBand™ (IB). System 20 further comprises a host memory, in the present example a Dynamic Random-Access Memory (DRAM) 40.

In the present example, peripheral device 24 is a high-performance network adapter that connects host 28 to a packet network 36. High-performance network adapters of this sort, which have considerable internal processing capabilities, are also referred to as "smart-NICs" or Data Processing Units (DPUs). Alternatively, peripheral device 24 may comprise a storage device, a GPU, an accelerator, or any other suitable type of peripheral device.

Peripheral device 24 comprises a System-on-Chip (SoC) 44 and a device memory, in the present example a DRAM 48. DRAM 48 (serving as a device memory) should not be confused with DRAM 40 (serving as a host memory). SoC 44 can be viewed as performing two principal tasks—(i) internal processing and (ii) PCIe communication with host 28. Internal processing may involve any suitable type of processing, e.g., packet processing in the case of a network adapter, mathematical computations and/or offloading operations in the case of an accelerator, etc.

For performing the internal processing, SoC 44 comprises one or more processing cores (in the present example a plurality of ARM cores 52), one or more coherent caches 56, a coherent interconnect 56 (also referred to as a "coherent fabric"), and a memory controller 60. Cores 52 store data in DRAM 48 using memory controller 60, and may cache some of the data in caches 56. Cores 52 communicate with caches 56 and with memory controller 60 via coherent interconnect 64, also referred to as a coherent fabric. Cores 52, memory controller 60 and caches 56 are referred to herein collectively as "electronic components" that are connected by coherent interconnect 64.

In the present example, coherent interconnect 64 operates in accordance with the CHI protocol. The basic data unit of the CHI protocol is a 32-byte message referred to as a Flow-Control Unit (FLIT). More generally, CHI is regarded herein as a non-limiting example of a coherent interconnect protocol, and FLITs are regarded as a non-limiting example of messages of the coherent interconnect protocol.

Interconnect 64 comprises multiple ports, and a plurality of switches that forward each FLIT from an input port (over which the FLIT enters the interconnect) to an output port (the port over which the FLIT departs the interconnect to its destination). Typically, multiple different physical routes exist between a given input port and a given output port via interconnect 64. One of the attributes of a FLIT is a hash value, which is used by the switches to select a physical route for that FLIT.

For performing PCIe communication, SoC 44 comprises a PCI EP 76 that handles PCIe communication with host 28 over PCIe link 32. SoC 44 further comprises a NIC 72, which acts as a PCIe EP, for communicating using Ethernet over network 36. NIC 72 communicates using PCIe with PCIe EP 76. NIC 72 is also connected to coherent interconnect 64 by a PCIe Request Node-Full (PRNF) module 68. PRNF 68 translates between the PCIe and CHI protocols, including maintaining transaction ordering as required by PCIe.

In addition, SoC 44 comprises one or more PCIe EP devices 80. Each PCI EP device 80 performs some designated processing task, and communicates with PCIe EP 76 using PCIe. Examples of tasks that may be performed by PCIe EP devices 80 include Direct Memory Access (DMA), cryptography operations, compression and/or decompression, various acceleration or offloading tasks, or any other suitable task.

As part of the operation of peripheral device 24, PCIe EP devices 80 should send and receive PCIe packets to and from PCIe EP 76, which in turn sends and receives PCIe packets to and from host 28. For clarity, PCIe EP devices 80 and PCIe EP 76 are referred to as "PCIe modules" that send and receive PCIe packets to one another. The description that follows refers mainly to PCIe Transaction-Level Packets (TLPs) as an example of PCIe packets. The size of a TLP may vary, e.g., 128, 256 or 512 bytes. More generally, PCIe packets are regarded as one non-limiting example of peripheral-bus packets.

As noted above, PCIe EP devices 80 may be scattered across SoC 44. Routing dedicated PCIe connections between PCIe EP devices 80 and PCIe EP 76 is highly challenging. Instead, in embodiments of the present invention, the PCIe traffic (e.g., TLPs) between PCIe EP devices 80 and PCIe EP 76 is "tunneled" over coherent interconnect 64.

In some embodiments, SoC 44 comprises a plurality of tunneling circuits referred to as tunneling adapters 84. A given tunnel adapter 84 is coupled between a respective PCIe module (a PCIe EP device 80 or PCIe EP 76) and a port of coherent interconnect 64. The tunnel adapter translates between PCIe packets and CHI FLITs. On transmission, tunnel adapter 84 receives PCIe packets from its respective PCIe module, translates each PCIe packet into one or more CHI FLITs, and sends the FLITs to coherent interconnect 64. On reception, tunnel adapter 84 receives CHI FLITs from coherent interconnect 64, reconstructs PCIe packets from the FLITs, and sends the PCIe packets to the PCIe module. Logically, these operations can be viewed as sending PCIe packets via a "tunnel" 86 in coherent interconnect 64. Tunneling techniques, including detailed operation of tunnel adapters 84, are described further below.

The configurations of system 20, including the internal configuration of peripheral device 24 and SoC 44, as shown in FIG. 1, are example configurations that are chosen purely for the sake of conceptual clarity. In alternative embodiments, any other suitable configurations used. Elements that are not necessary for understanding the principles of the present invention have been omitted from the figures for clarity.

The various elements of system 20, including the elements of peripheral device 24 and in particular SoC 44, may be implemented in hardware, e.g., in one or more Application-Specific Integrated Circuits (ASICs) or FPGAs, in software, or using a combination of hardware and software elements. In some embodiments, Certain elements of SoC 44 may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Example Tunneling Scheme

In various embodiments, tunnel adapters 84 may translate between PCIe packets (e.g., TLPs) and CHI FLITs in different ways.

Figures 2, 3:
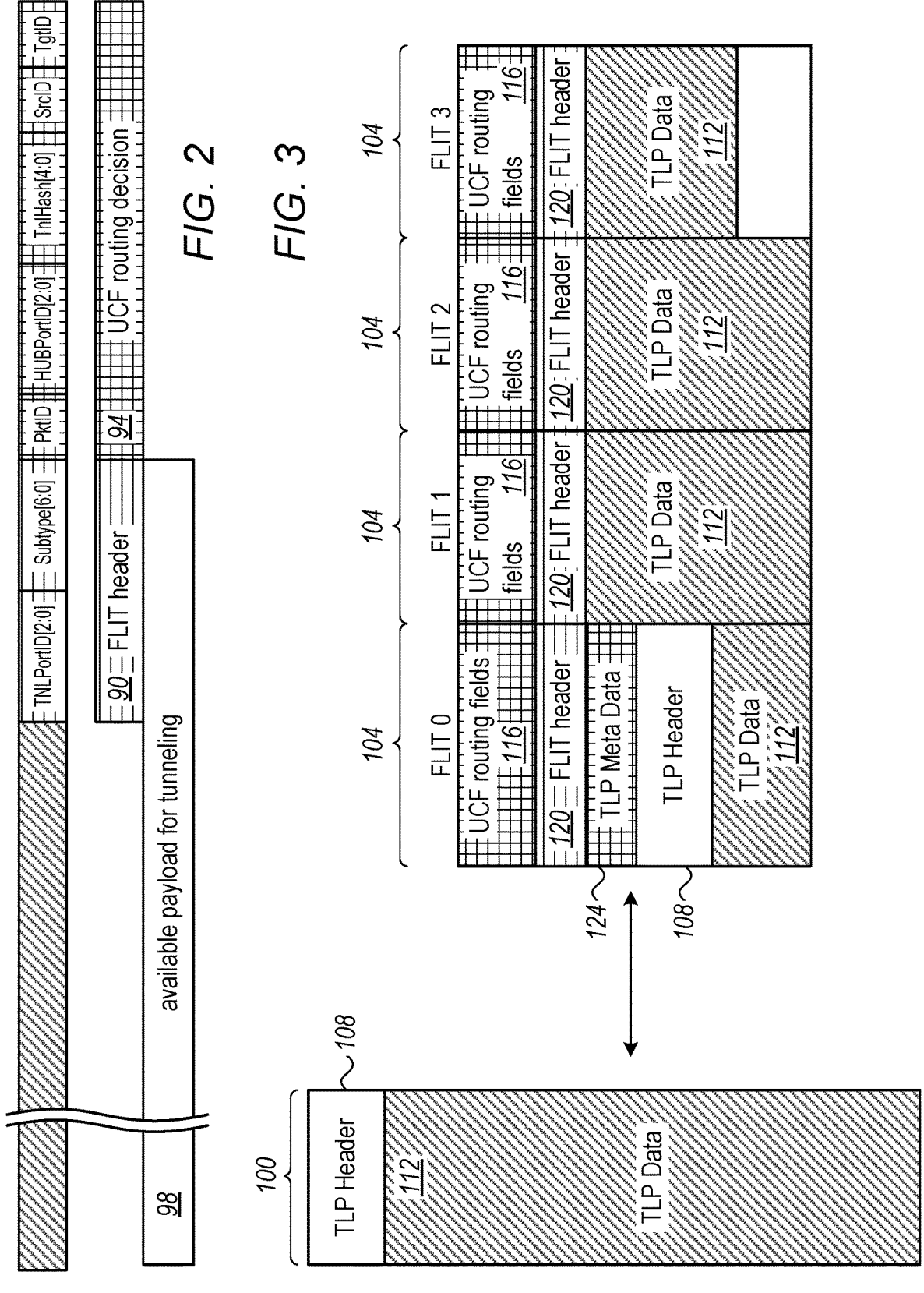
FIG. 2 is a diagram that schematically illustrates a structure of a Coherent Hub Interface (CHI) Flow-Control Unit (FLIT) used for tunneling PCIe traffic over a coherent interconnect, in accordance with an embodiment of the present invention.
FIG. 3 is a diagram that schematically illustrates translation between a PCIe Transaction-Layer Packet (TLP) and a plurality of CHI FLITs, in accordance with an embodiment of the present invention.

FIG. 2 is a diagram that schematically illustrates a structure of a CHI FLIT used for tunneling PCIe traffic over coherent interconnect 64, in accordance with an embodiment of the present invention. In the present example, the FLIT comprises a FLIT header 90, routing fields 94 (also referred to as Unified Coherent Fabric (UCF) routing decision fields), and a payload 98.

FLIT header 90 comprises header fields that affect the setting-up, tearing-down and termination of tunnels 86 by tunnel adapters 84. Flit header fields may comprise, for example, the following:

A tunnel port ("TNLPortID") field. This field can be used, for example, by a receiving tunnel adapter 84 that serves multiple PCIe EP devices, to identify which of the PCIe EP devices the PCIe packet is addressed to. FLITs belonging to the same PCIe packet should be assigned the same tunnel port value.

A "Subtype" field indicating the type of tunneled PCIe packet being transported in the FLIT. Example types include "PCIe TLP", "credit message", etc.

Routing fields 94 specify how the FLIT is to be routed by coherent interconnect 64. Routing fields 94 may comprise, for example, the following:

A packet identifier ("PktID") field. In some embodiments, in FLITs that convey PCIe traffic the PktID field is set to a value indicating "tunneled".

A hub port identifier ("HUBPortID") field, specifying the port of core 64 to which the FLIT should be routed.

A tunnel hash ("TnlHash") field. This field is used for ensuring in-order delivery of selected FLITs, as will be elaborated below. The tunnel hash field is regarded valid only when the PktID field is set to "tunneled".

A source identifier ("SrcID") field and a target identifier ("TgtID") field.

FIG. 3 is a diagram that schematically illustrates translation between a PCIe Transaction-Layer Packet (TLP) 100 and a plurality of CHI FLITs 104, as performed by tunnel adapter 84, in accordance with an embodiment of the present invention. As noted above, FLITs 104 have a fixed size of 32 bytes. TLP 100 may vary in size, e.g., 128, 256 or 512 bytes, and is larger than FLIT 104. Tunnel adapter 84 therefore typically translates a given TLP 100 into multiple FLITs 104, and vice versa. In the example of FIG. 3, TLP 100 is tunneled over four FLITs denoted FLIT 0 . . . FLIT 3.

TLP 100 comprises a TLP header 108 and TLP data 112, in accordance with the PCIe specification. When translating TLP 100 into FLITs 104, tunnel adapter 84 inserts TLP header 108 in FLIT 0, and inserts TLP data 112 across the four FLITs. In addition, in accordance with the CHI protocol, tunnel adapter 84 populates routing fields 116 and FLIT header 120 of each FLIT 104. Tunnel adapter 84 also inserts TLP metadata 124 in FLIT 0.

Ensuring In-Order Delivery of Selected FLITs

In general, coherent interconnect 64 does not guarantee in-order delivery of FLITs (i.e., does not guarantee that a sequence of FLITs sent from a certain input port to a certain output port will exit the output port in the same order they were provided to the input port). For example, as noted above, coherent interconnect 64 may comprise multiple different physical routes between a given input port and a given output port. The different routes may have different latencies, e.g., because they traverse different numbers of switches and "hops". A sequence of FLITs that is distributed across two or more routes may arrive out-of-order.

For some FLIT sequences, however, in-order arrival is important. For example, it may be important that the FLITs that correspond to the same TLP (e.g., FLIT 0-FLIT 3 in FIG. 3 above) will arrive in the same order they were sent.

When multiple routing possibilities exist, the switches in interconnect 64 choose a route for a FLIT based on the tunnel hash ("TnlHash") field value of the FLIT. In some embodiments, tunnel adapter 84 ensures that a selected group of FLITs will be delivered in-order to the peer tunnel adapter at the far side of interconnect 64, by assigning the same tunnel hash value to the FLITs in the group. For example, in some embodiments tunnel adapter 84 assigns the same tunnel hash value to the FLITs that carry the same TLP.

Requirements for in-order delivery of FLITs may differ from one PCIe EP device 80 to another, depending on the EP device functionality. The above-described ordering mechanism gives PCIe EP devices 80 control to specify the ordering as needed.

Typically, for FLITs that do not require in-order delivery, tunnel adapters 84 will aim to assign different tunnel hash values. Assigning different tunnel hash values improves the distribution FLITs of across different routes in the coherent interconnect ("multipathing"), and therefore enhances throughput and load balancing.

In some embodiments, certain PCIe modules may require in-order delivery of certain PCIe packets (not to be confused with in-order delivery of FLITs belonging to a PCIe packet). The transmitting tunnel adapter ensures the packet-level ordering by assigning the same tunnel hash values to all the FLITs belonging to all the PCIe packets in the group. In an example embodiment, the interface between the transmitting tunnel adapter and the locally-coupled PCIe module enables the PCIe module to specify the following for each PCIe packet being transferred to the tunnel adapter:

Order Enable: A field that indicates whether in-order delivery is required for this PCIe packet, within a group of multiple PCIe packets.

Order ID: A five-bit index identifying the group of PCIe packets for which the in-order delivery is required. This index enables the PCIe module and tunnel adapter to handle multiple different groups of PCIe packets, and ensure in-order delivery within each group.

Flow Control Using End-to-End Credits

Consider a certain tunnel adapter 84 (referred to in this context as a "transmitting tunnel adapter") that sends CHI FLITs to a peer tunnel adapter 84 (referred to as a "receiving tunnel adapter") over interconnect 64. (A given tunnel adapter 84 may serve as a "transmitting tunnel adapter" for one or more flows of FLITs, and as a "receiving tunnel adapter" for one or more other flows of FLITs, possibly at the same time. The description below focuses on a specific flow for simplicity.)

At certain times, the receiving tunnel adapter may be unable to handle the data bandwidth transmitted by the transmitting tunnel adapter, e.g., due to buffer overflow. Therefore, in some embodiments tunnel adapters 84 support a credit-based flow control mechanism, to ensure that the transmitting tunnel adapter does not exceed the data bandwidth that can be handled by the receiving tunnel adapter.

In an example embodiment, the receiving tunnel adapter allocates "credits" to the transmitting tunnel adapter by sending credit messages over interconnect 64. The allocated credits indicate quotas of data that can be transmitted by the transmitting tunnel adapter. When the receiving tunnel adapter approaches a point where it will be unable to handle additional bandwidth, it will stop allocating new credits or allocate fewer credits. As a result, the transmitting tunnel adapter will throttle down its transmission bandwidth. When the receiving tunnel adapter is again able to handle new traffic, it will allocate new credits, thereby enabling the transmitting tunnel adapter to resume transmission.

In some embodiments, a receiving tunnel adapter receives FLITs from two or more transmitting tunnel adapters. In such a configuration, the receiving tunnel adapter typically maintains a separate and independent credit mechanism vs. each of the transmitting tunnel adapters.

8

Tunnel Adapter Transmit-Side and Receive-Side Processing

The description below provides examples of the transmit-side processing and the receive-side processing carried out by tunnel adapters 84. Transmit-side processing refers to the process of translating PCIe packets into CHI FLITs and sending the FLITs over coherent interconnect 64. The Receive-side processing refers to the process of reconstructing PCIe packets from CHI FLITs received over coherent interconnect 64. Since the communication between PCIe modules is typically bidirectional, a given tunnel adapter typically performs both transmit-side processing and receive-side processing.

FIG. 4 is a flow chart that schematically illustrates an example transmit-side process, i.e., a method for translating a PCIe TLP into CHI FLITs, in accordance with an embodiment of the present invention. The method begins with a tunnel adapter 84 receiving a PCIe TLP from a locally-coupled PCIe module (e.g., PCIe EP device 80 or PCIe EP 76), at a TLP input stage 130. At a FLIT creation stage 134, tunnel adapter 84 creates one or more FLITs that will transport TLP header 108 and TLP data 112 of the TLP in question. The number of FLITs depends on the size of TLP data 112.

At a FLIT population stage 138, tunnel adapter 84 populates routing fields 116 and FLIT headers 120 of the FLITs. As explained above, tunnel adapter 84 sets the packet ID ("PktID") to "tunneled". Additionally, tunnel adapter 84 assigns the same tunnel hash ("TnlHash") value to all the FLITs that correspond to the TLP. As a result, the switches in coherent interconnect 64 will route all the FLITs of the TLP over the same physical route. The FLITs of the TLP are therefore guaranteed to arrive in-order to the peer tunnel adapter 84.

At a credit checking stage 142, tunnel adapter 84 checks whether credits are available for sending the FLITs. If not, the tunnel adapter waits until sufficient credits become available. If sufficient credits are available, tunnel adapter 84 sends the FLITs to coherent interconnect 84, at a transmission stage 146.

FIG. 5 is a flow chart that schematically illustrates an example receive-side process, i.e., a method for translating CHI FLITs into a PCIe TLP, in accordance with an embodiment of the present invention. The method begins with tunnel adapter 84 receiving a CHI FLIT from coherent interconnect 64, at a FLIT reception stage 150. The received FLIT carries information belonging to a certain PCIe TLP to be reconstructed.

At a new TLP checking stage 154, tunnel adapter 84 checks whether the received FLIT is the first FLIT in a new TLP to be reconstructed. If so, tunnel adapter 84 creates a context for saving information for the new TLP, at a context creation stage 158. The context may comprise information such as the source of the TLP (the PCIe module that sent the TLP) and/or any other suitable information. If the TLP is not new, i.e., the received FLIT is not the first FLIT of the TLP, stage 158 is skipped.

At an extraction stage 162, tunnel adapter 84 extracts the data and metadata from the received FLIT. The extracted data and metadata may comprise any or all of the fields seen in FIGS. 2 and 3 above. At a TLP population stage 166, tunnel adapter 84 populates the TLP being reconstructed with the extracted data and metadata. At this stage the tunnel adapter may update the context of the source in question to reflect the current connection stage.

At a last FLIT checking stage 170, tunnel adapter 84 checks whether the received FLIT was the last FLIT that carries the information of the TLP. If not, the method loops back to stage 150 for receiving and handling the next FLIT of the TLP. If the received FLIT was the last FLIT, tunnel adapter 84 sends the reconstructed TLP to the locally-coupled PCIe module (PCIe EP device 80 or PCIe EP 76), at a TLP output stage 174. (In practice, tunnel adapter 84 is typically aware of the number of FLITs that convey the TLP being reconstructed. In other words, the last TLP is typically not marked as such.)

The method flows of FIGS. 4 and 5 above are example flows that have been chosen purely for the sake of conceptual clarity. In alternative embodiments, any other suitable flows can be used for implementing transmit-side and receive-side processing in tunnel adapters 84.

Although the embodiments described herein mainly address CHI and PCIe, the methods and systems described herein can be used in tunneling of any other suitable protocol over any other suitable type of coherent interconnect.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
two or more peripheral-bus modules, to exchange peripheral-bus packets with one another in accordance with a peripheral-bus protocol;
a coherent interconnect, to connect electronic components of the peripheral device in accordance with a coherent interconnect protocol; and
two or more tunnel adapters, which are coupled between the peripheral-bus modules and the coherent interconnect, and which are to convey the peripheral-bus packets between the peripheral-bus modules over the coherent interconnect, by translating between the peripheral-bus packets and messages of the coherent interconnect protocol.

2. The peripheral device according to claim 1, wherein a given peripheral-bus module among the peripheral-bus modules is to communicate with a host over a peripheral bus in accordance with the peripheral-bus protocol.

3. The peripheral device according to claim 1, wherein the messages of the coherent interconnect protocol are smaller in data size than the peripheral-bus packets, and wherein a given tunnel adapter among the tunnel adapters is to translate a peripheral-bus packet into a plurality of the messages.

4. The peripheral device according to claim 1, wherein the messages of the coherent interconnect protocol are smaller in data size than the peripheral-bus packets, and wherein a given tunnel adapter among the tunnel adapters is to identify a plurality of the messages corresponding to a peripheral-bus packet, and to reconstruct the peripheral-bus packet from the identified plurality of messages.

5. The peripheral device according to claim 1, wherein the coherent interconnect protocol does not guarantee unconditional in-order delivery of the messages, and wherein, in translating the peripheral-bus packets into the messages, a given tunnel adapter among the tunnel adapters is to select two or more of the messages, and to cause the coherent interconnect to deliver the selected messages in-order.

6. The peripheral device according to claim 5, wherein the given tunnel adapter is to cause the coherent interconnect to deliver the selected messages in-order by assigning to the selected messages a same hash value, thereby causing the coherent interconnect to route the selected messages over a same route.

7. The peripheral device according to claim 1, wherein a given tunnel adapter among the tunnel adapters is to:
receive messages corresponding to peripheral-bus packets originating from multiple different peripheral-bus modules;
maintain a respective context for each of the multiple different peripheral-bus modules; and
reconstruct the peripheral-bus packets originating from each of the multiple different peripheral-bus modules using the respective context.

8. The peripheral device according to claim 1, wherein at least two of the tunnel adapters are to control a flow of the messages therebetween by applying credit-based flow control.

9. A method, comprising:
exchanging peripheral-bus packets between two or more peripheral-bus modules in a peripheral device, in accordance with a peripheral-bus protocol;
communicating among electronic components of the peripheral device using a coherent interconnect, in accordance with a coherent interconnect protocol; and
conveying the peripheral-bus packets between the peripheral-bus modules over the coherent interconnect, by translating between the peripheral-bus packets and messages of the coherent interconnect protocol.

10. The method according to claim 9, further comprising, using a given peripheral-bus module among the peripheral-bus modules, communicating with a host over a peripheral bus in accordance with the peripheral-bus protocol.

11. The method according to claim 9, wherein the messages of the coherent interconnect protocol are smaller in data size than the peripheral-bus packets, and wherein translating between the peripheral-bus packets and the messages of the coherent interconnect protocol comprises translating a peripheral-bus packet into a plurality of the messages.

12. The method according to claim 9, wherein the messages of the coherent interconnect protocol are smaller in data size than the peripheral-bus packets, and wherein translating between the peripheral-bus packets and the messages of the coherent interconnect protocol comprises identifying a plurality of the messages corresponding to a peripheral-bus packet, and reconstructing the peripheral-bus packet from the identified plurality of messages.

13. The method according to claim 9, wherein the coherent interconnect protocol does not guarantee unconditional in-order delivery of the messages, and wherein translating the peripheral-bus packets into the messages comprises selecting two or more of the messages, and causing the coherent interconnect to deliver the selected messages in-order.

14. The method according to claim 13, wherein causing the coherent interconnect to deliver the selected messages in-order comprises assigning to the selected messages a same hash value, thereby causing the coherent interconnect to route the selected messages over a same route.

15. The method according to claim 9, wherein translating the messages into the peripheral-bus packets comprises:

receiving messages corresponding to peripheral-bus packets originating from multiple different peripheral-bus modules;

maintaining a respective context for each of the multiple different peripheral-bus modules; and reconstructing the peripheral-bus packets originating from each of the multiple different peripheral-bus modules using the respective context.

16. The method according to claim 9, and comprising controlling a flow of the messages by applying credit-based flow control.

* * * * *